United States Patent
Ito

(10) Patent No.: US 6,234,505 B1
(45) Date of Patent: May 22, 2001

(54) FRONT FORK

(75) Inventor: Naoki Ito, Toyko (JP)

(73) Assignee: Kayaba Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/353,447

(22) Filed: Jul. 14, 1999

(30) Foreign Application Priority Data

Jul. 15, 1998 (JP) .................................................. 10-199925

(51) Int. Cl.[7] .................................. F16F 5/00; F16F 9/36; B62K 25/04
(52) U.S. Cl. .................. 280/276; 188/322.17; 267/64.26
(58) Field of Search .................................... 180/219, 227; 280/276, 277; 267/64.26; 188/322.19, 322.16, 322.17

(56) References Cited

U.S. PATENT DOCUMENTS

| | | | |
|---|---|---|---|
| 3,912,054 | * 10/1975 | Fabre et al. | 280/276 |
| 4,438,909 | * 3/1984 | Matsumoto | 267/64.26 |
| 4,493,490 | * 1/1985 | Ohma | 280/276 |
| 4,561,669 | * 12/1985 | Simons | 280/276 |
| 4,795,009 | * 1/1989 | Tanahashi et al. | 188/322.17 |
| 4,807,860 | * 2/1989 | Simons | 280/276 |
| 4,964,625 | * 10/1990 | Kawamura | 188/322.19 |
| 6,042,091 | * 3/2000 | Marzocchi et al. | 267/64.26 |

FOREIGN PATENT DOCUMENTS

| | | | |
|---|---|---|---|
| 2-182592 | * | 7/1990 | (JP) . |
| 5-126194 | * | 5/1993 | (JP) . |
| 7-205868 | * | 8/1995 | (JP) . |
| 8-26169 | * | 1/1996 | (JP) . |

* cited by examiner

Primary Examiner—Lanna Mai
Assistant Examiner—Ruth Ilan
(74) Attorney, Agent, or Firm—Rabin & Champagne, PC

(57) ABSTRACT

A front fork for a motorcycle in which an outer tube (1), an inner tube (2) which is inserted to slide freely in said outer tube (1), a damper cylinder (3) disposed on the bottom of said inner tube (2), a piston (4) accommodated in said damper cylinder (3), a piston rod (5) connected to said piston (4) and said outer tube (1), a spring (7) pushing said outer tube (1) and said piston rod (5) in an extending direction, a tubular guide (12) disposed on an upper end of said damper cylinder (3); and a free piston (15) disposed to displace freely in a vertical direction along said guide (12), said free piston (15) separating an upper reservoir (14) and a lower oil chamber (13) in said inner tube (2) and supporting an end of said spring (7).

7 Claims, 4 Drawing Sheets

FRONT FORK

FIELD OF THE INVENTION

The present invention relates to a front fork for a motorcycle which functions as a fork and a shock absorber that absorbs shocks such as vibrations from a road surface.

BACKGROUND OF THE INVENTION

Jikkai-Hei 56-76588 published by the Japanese Patent Office in 1981 describes a front fork of a motorcycle in which an air pressure chamber and a hydraulic chamber are separated by a free piston.

The front fork comprises an inner tube inserted into an outer tube that is open at its upper end. A hollow rod that is open at its upper end is provided at the center of the lower end of the outer tube. A free piston is disposed above the hollow rod and slides on an inner periphery of the inner tube. The free piston is pushed downwardly by a spring and separates a reservoir in the top of the inner tube and a hydraulic chamber in the hollow rod. The reservoir is linked through a check valve provided on the free piston with the hydraulic chamber in the hollow rod.

When the front fork is compressed, an increase of the volume of entry of the inner tube causes the free piston to rise against the spring. When the front fork is extended, the check valve is opened and a volume of oil equal to the retraction of the inner tube is introduced into the hollow rod from the reservoir.

In this conventional front fork, the free piston operates vertically during extension and compression. In particular, during compression, the inner tube slides downward and at the same time the free piston rises while sliding on the inner tube. As a result, the amount of stroke of the free piston is the sum of the stroke of the inner tube and the stroke of the free piston. Thus the degree of stroke of the seal provided on the outer periphery of the free piston is large which has the undesirable consequence that the life span of the seal is reduced as a result.

As reserve oil from the outer periphery of the seal or the gap of the check valve seeps to the lower side of the free piston, the amount of oil on the lower section of the free piston increases and the position of the free piston displaces upwardly. Thus the possibility exists that the initial load on the spring will increase.

SUMMARY OF THE INVENTION

Therefore it is an object of the present invention to increase the life span of the seal provided on the free piston.

It is a further object of the present invention to suppress undesirable increases in the initial load of the spring.

In order to achieve above the objects the present invention provides a front fork for a motorcycle.

The front fork for a motorcycle comprising an outer tube, an inner tube which is inserted to slide freely in the outer tube, a damper cylinder disposed on the bottom of the inner tube, a piston accommodated in the damper cylinder, a piston rod connected to the piston and the outer tube, a spring pushing the outer tube and the piston rod in an extending direction, a tubular guide disposed on an upper end of a damper cylinder and a free piston disposed to displace freely in a vertical direction along the guide, the piston separating an upper reservoir and a lower oil chamber in the inner tube and supporting an end of the spring.

The details as well as other features and advantages of the invention are set forth in the remainder of specification and are shown in accompanying drawings.

DESCRIPTION OF THE PREFERRED EMBODIMENTS

Figure 2:
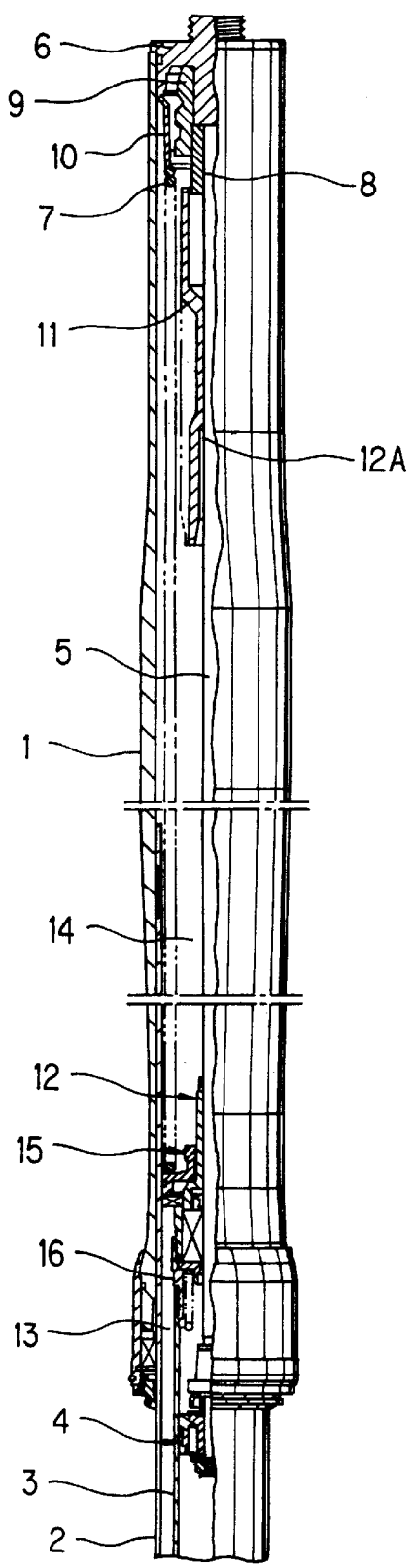
FIG. 2 is an longitudinal sectional view of the entire front fork.

Referring to FIG. 2 of the drawings, a front fork has an inner tube 2 which is connected to a wheel, and which is inserted into an outer tube 1 which is connected to a body. A damper cylinder 3 is disposed on the bottom of the inner tube 2. A piston rod 5 is inserted through a piston 4 into the damper cylinder 3. The upper end of the piston rod 5 is connected to an upper end of outer tube 1 through a cap 6. The piston rod 5 and the outer tube 1 push each other through a spring 7 provided in the outer tube 1 in an extending direction. The front fork is of an inverted type having the structure outlined above.

The upper end of the piston rod 1 is attached to the cap 6 and is secured to be tightened by a lock nut.

A cushioning rubber member 9 and a spring seat 10 are provided on the lower side of the cap 6. The cap 6 through the spring seat 10 supports the upper end of the spring 7.

A spring guide 11 is disposed on the upper outer peripheral section of the piston rod 5. The downward displacement of the spring guide 11 is prevented by a stopper 8 such as, i.e., a snap ring provided on the piston rod 5.

The inner periphery of the spring 7 is guided by the outer periphery of the spring guide 11 that prevents the generation of a buckling.

Figure 1:
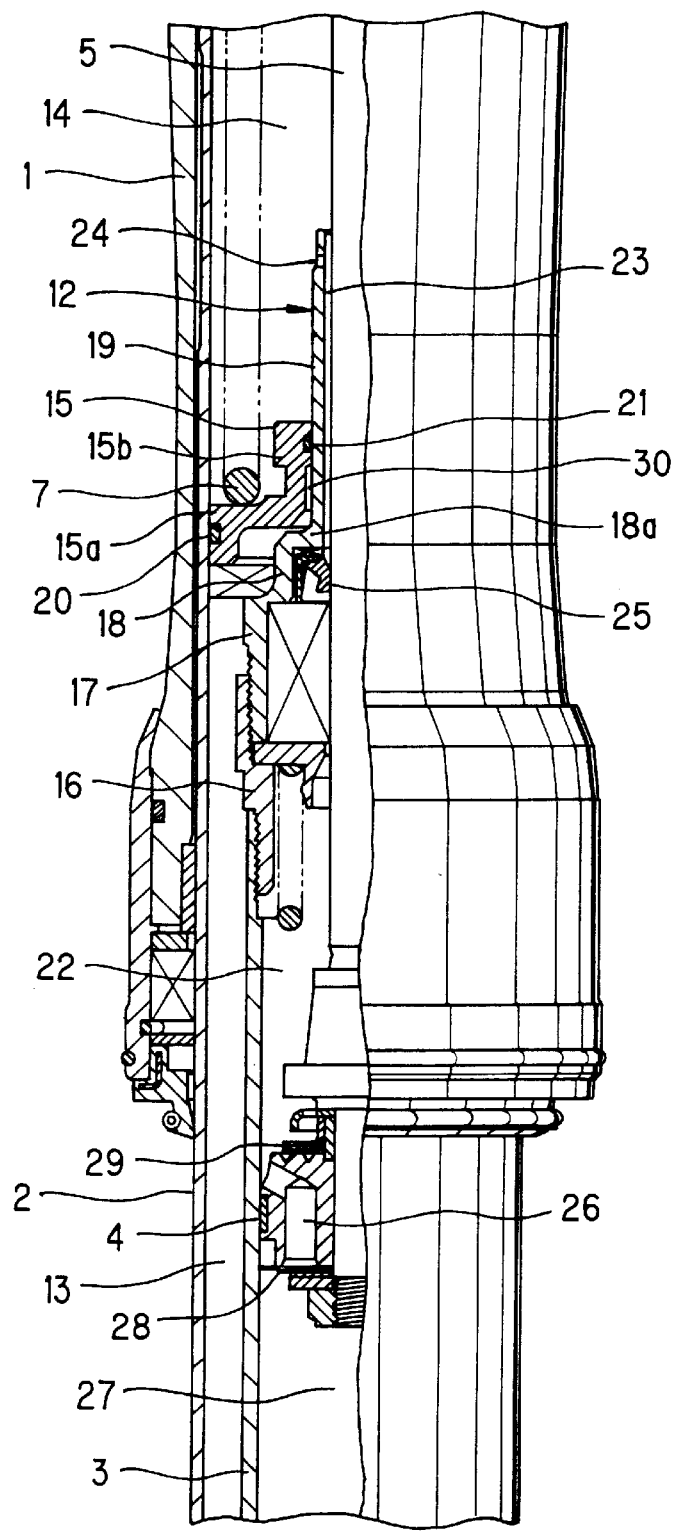
FIG. 1 is an enlarged longitudinal sectional view of an essential part of a front fork according to a first embodiment of the present invention.

Referring to FIG. 1, a tubular guide 12 is provided on the upper section of the damper cylinder 3 and a free piston 15 is free to displace vertically between the guide 12 and the inner tube 2. The free piston 15 separates the oil chamber 13 and the reservoir 14.

The guide 12 may be directly connected to the upper end of the damper cylinder 3, as shown in FIG. 1. The guide 12 may be screwed or welded to the upper section of a tubular adapter 16 which is screwed to the upper end of the damper cylinder 3.

The guide 12 comprises a hollow mount 17 connected to an upper end of the damper cylinder 3 through the adapter 16, a step support 18 for the free piston is formed on to the mount 17, and an inner hollow tubular body 19 is formed at a lower part to the support 18 and is disposed along the piston rod 5.

The free piston 15 comprises an annular main body 15a, a tubular section 15b disposed from the main body 15a, a seal 20 provided on the outer periphery of the main body 15a and a seal 21 provided on the inner periphery of the tubular section 15b.

The inner periphery of the free piston 15 contacts the outer periphery of the inner tubular body 19 via the seal 21 and the outer periphery of the free piston 15 contacts the inner periphery of the inner tube 2 via the seal 20.

The main body 15a of the free piston 15 has a limited downward stroke as the free piston 15 abuts with the support 18 provided with a step 18a.

An annular or slit-shaped gap 23 which communicates with the oil chamber 22 of the damper cylinder 3 and the reservoir 14 is formed between the inner tubular body 19 forming the guide 12 and the piston rod 5. A horizontal through hole 24 that communicates with the gap 23 and the reservoir 14 is formed on the upper section of the inner tubular body 19.

A check seal 25 is provided on the inner side of the support 18. The check seal 25 prevents oil leaks from the oil chamber 22 to the reservoir 14 and allows oil flow to the oil chamber 22 through the gap 23 from the reservoir 14 when a negative pressure exists in the oil chamber 22.

When the front fork operates, the piston 4, the piston rod 5 and the outer tube 1 rise during extension of the front fork and oil from the upper oil chamber 22 in the damper cylinder 3 flows into the lower oil chamber 27 through the damping valve 28 and the port 26 of the piston 4. Oil equal to the volume of retraction of the piston rod 5 is introduced into the lower oil chamber 27 from the oil chamber 13 and the damping valve 28 generates a damping force. At this time, the free piston 15 displaces downward due to a force of the spring 7.

The piston 4 is depressed during compression of the front fork and oil from the lower oil chamber 27 is introduced into the upper oil chamber 22 through the check valve 29 and the port provided on the piston 4. Oil equal to the entry of the piston rod 5 is introduced into the oil chamber 13 from the lower oil chamber 27. Thus the free piston 15 is raised against the force of the spring 7 by the volume of introduced oil.

The free piston 15 displaces upwardly along the outer periphery of the inner tubular body 19 through the seal 21 and the inner periphery of the inner tube 2 through the seal 20. The degree of slide experienced by the seals 20, 21 at this time results only from the stroke of the free piston 15 which displaces due to the oil introduced into the oil chamber 13 from the lower oil chamber 27. As the degree of slide is low, it has little effect on the overall operation of the front fork and thus the life span of the seals 20, 21 is not adversely affected.

The check seal 25 allows oil flow to the oil chamber 22 from the reservoir 14 when a negative pressure exists in the oil chamber 22 by rapid extension and compression operations. When a greater amount of oil than necessary has accumulated in the oil chamber 13 under the free piston 15 due to oil leaks from the seals 20, 21, the free piston 15 is raised accordingly. As a result, an inner gap 30 of the tubular body 15b opens the through hole 24 and oil with the added pressure of the oil chamber 13 relieves into the reservoir 14 through the through hole 24. In this way, it is possible to prevent variations in the initial load of the spring 7 since the pressure acting on the free piston 15 is released.

During maximum compression, the free piston 15 compresses the cushioning rubber member 9 with the upper end of the spring guide 11. A load from the cushioning rubber member 9 is applied to the free piston 15 and the oil chambers 22, 27 in the damper cylinder 3 and the oil chamber 13 act as a shock absorbing oil chamber and create a soft shock absorbing action during maximum compression with the assisting absorbing force of the cushioning rubber member itself.

Since the inner sides of the free piston slide along the guide 12 and the guide 12 is fixed, thus the seals 20 of the free piston 15 which are fitted to the guide 12 and are not fitted to the piston rod 5 slide only through a stroke of the free piston 15. Since the amount of sliding is small, the life span of the seals is improved.

A through hole 24 is provided in the guide 12 and the inner gap 30 is provided in the free piston 15. Thus oil which has accumulated in the oil chamber 13 can be relieved to the reservoir 14 through the inner gap 30 and the through hole 24. Therefore it is possible to prevent variations to the initial load of the spring 7 by reducing the pressure applied to the spring 7 through the free piston 15.

As the reservoir 14 and the oil chamber 13 are separated by the free piston 15, air from the reservoir 14 can be prevented from leaking into the oil chamber 13 and damping force can therefore be stabilized. Furthermore since the free piston 15 is pressed by the spring 7 and the oil chamber 13 and the oil chambers 22, 27 in the damper cylinder 3 are pressurized by the free piston 15, a response time of damping force is improved and shocks proximate to maximum compression are absorbed to the degree to which the oil chambers 22, 27 are pressurized.

Since the check valve 25 is provided which allows unidirectional flow with the reservoir 14 and the damper cylinder 3, when a slight negative pressure exists in the damper cylinder, oil may be drawn into the cylinder 3 to stabilize damping force.

Figure 3:
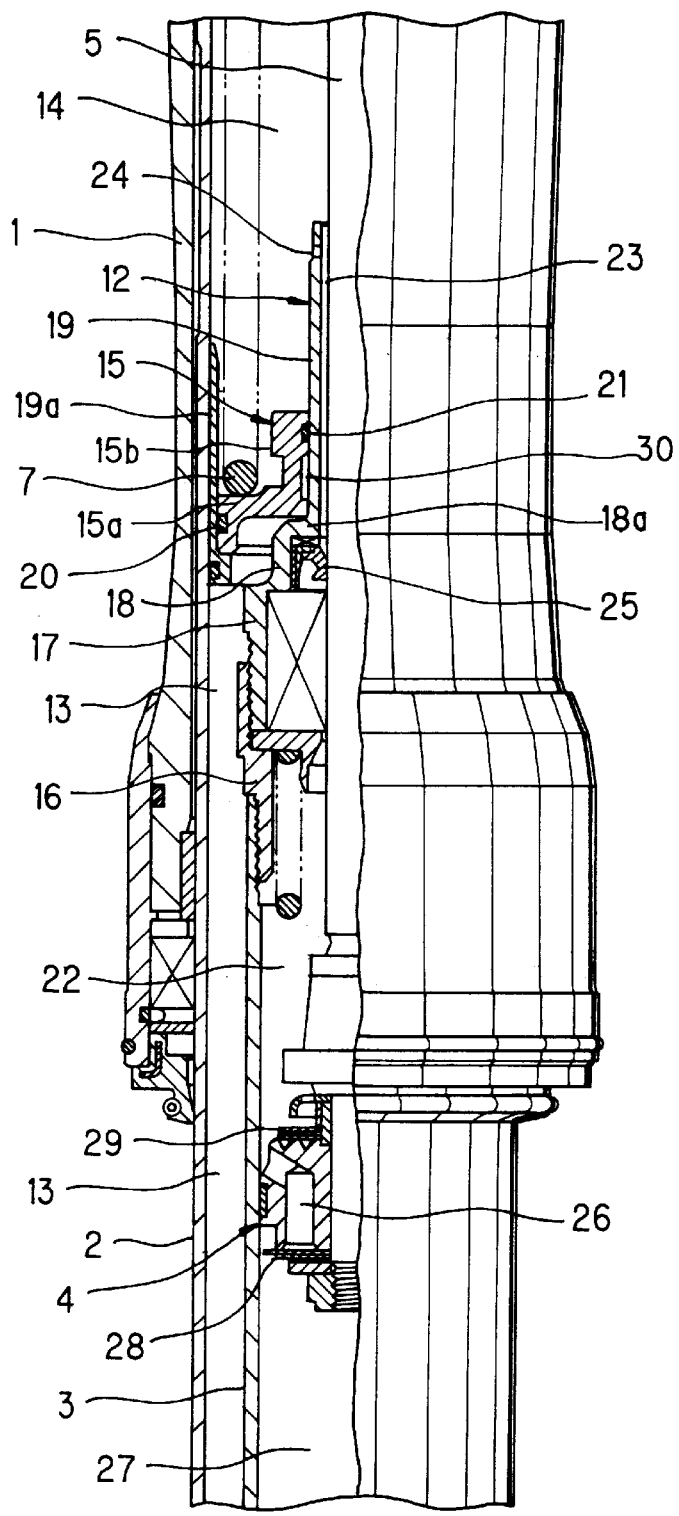
FIG. 3 is similar to FIG. 1, but showing a second embodiment of the present invention.

Next referring to FIG. 3, a second embodiment of the invention will be described. However since all components other than the groove of the guide are the same as the above-described embodiment, similar components are designated by the same numerals as FIG. 1.

The guide 12 of the second embodiment comprises the hollow mount 17 connected to an upper end of a damper cylinder 3, a support 18 of the free piston formed at the mount 17, an inner tubular body 19 formed at the top of the support 18 and disposed along the piston rod 5, and the outer tubular body 19a disposed in contact with the inner tube 2.

The free piston 15 slides freely between the inner periphery of the outer tubular body 19a and the outer periphery of the inner tubular body 19 through the seal 20, 21. Since it is possible for the free piston 15 to slide without reference to the inner tube 2, the seals 20 of the free piston 15 which are not fitted to the inner tube 2 slide only through a stroke of the free piston 15. Since the amount of sliding is small, the life span of the seal 20 is improved. Other operations are the same as those shown in FIG. 1.

Figure 4:
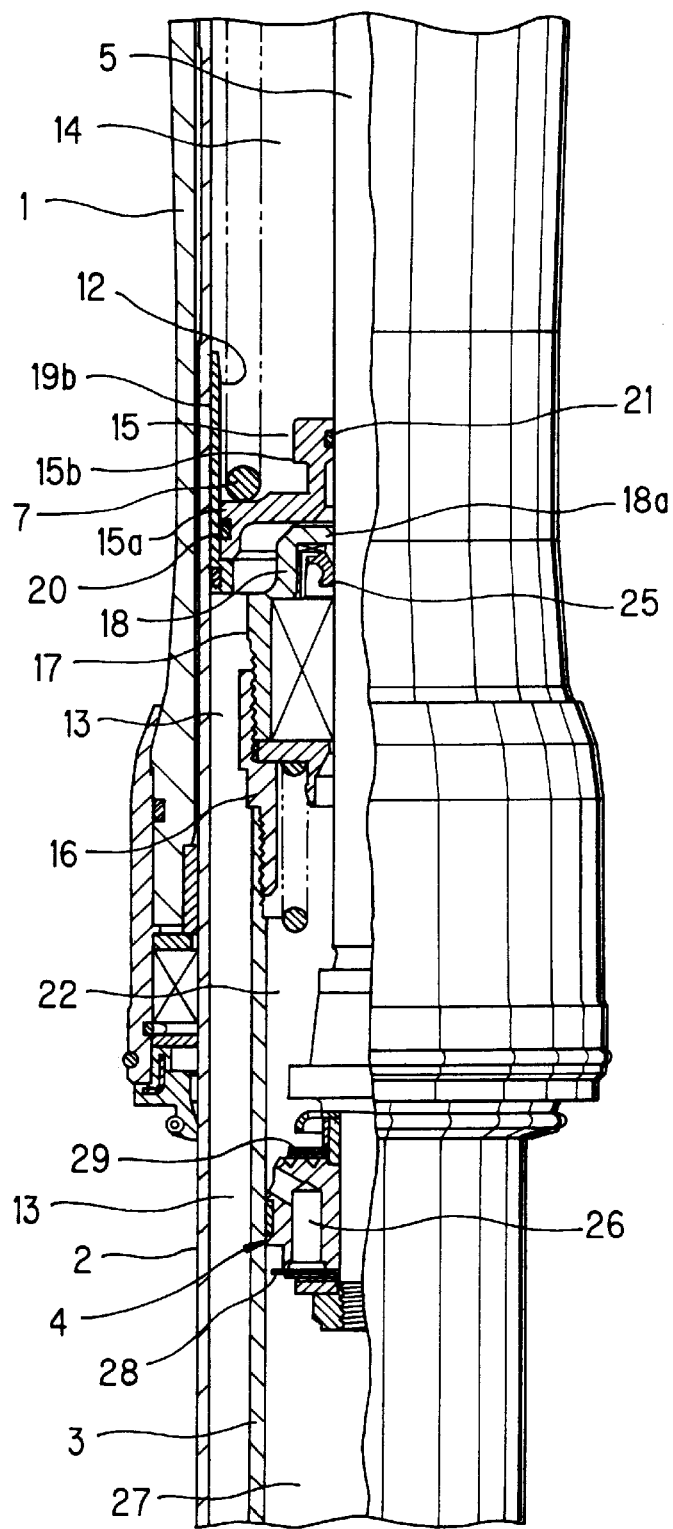
FIG. 4 is similar to FIG. 1, but showing a third embodiment of the present invention.

Next referring to FIG. 4, a third embodiment of the present invention will be described. The guide 12 of the front fork according to this embodiment comprises the hollow mount 17 connected to an upper end of the damper cylinder 3. The support 18 for the free piston is formed at the mount 17. The outer tubular body 19b is disposed in contact with the inner tube 2.

The inner periphery of the free piston 15 slides freely on the outer periphery of the piston rod 5 and the outer periphery of the free piston slides on the inner periphery of the outer tubular body 19b. Furthermore a check seal 25 is provided which allows oil flow to the upper oil chamber 22 in the damper cylinder 3 from the reservoir 14 in the mount 17 in the guide 12.

In the present embodiment, excess oil accumulated below the free piston 15 escapes to the reservoir 14 when the outer periphery of the seal 20, 21 rise to a position which separates from the top end of the inner tubular body 19b. The operation of the relief mechanism is the same as those shown in FIG. 1 and FIG. 3. Other operations and effects are the same as those shown in FIG. 1.

The entire contents of Japanese Patent Application P10-199925 (filed Jul. 15, 1998) are incorporated herein by reference. Although the invention has been described above by reference to certain embodiments of the invention, the invention is not limited to the embodiments described above. Modifications and variations of embodiments described above will occur to those skilled in the art, in light of the above teaching.

The scope of the invention is defined with reference to the following claims.

What is claimed is:

1. A front fork for a motorcycle, comprising:

an outer tube;

an inner tube which is inserted to slide freely in said outer tube;

a damper cylinder disposed concentrically within and longitudinally below a top of said inner tube;

a piston accommodated in said damper cylinder;

a piston rod connected to said piston and said outer tube;

a spring pushing said outer tube and said piston rod in an extending direction;

a tubular guide disposed on an upper end of said damper cylinder; and a free piston disposed to displace freely in a vertical direction along said guide, said free piston separating an upper reservoir and a lower oil chamber in said inner tube and supporting an end of said spring.

2. A front fork for a motorcycle according to claim 1, wherein said guide comprises:

a hollow mount fixed to an upper end of said damper cylinder;

a support for said free piston formed at an upper part of said hollow mount; and a hollow inner tubular body formed at an upper part of said support and disposed along said piston rod; wherein an inner periphery of said free piston slides freely on an outer periphery of said inner tubular body and an outer periphery of said free piston slides freely on an inner periphery of said inner tube.

3. A front fork for a motorcycle according to claim 1, wherein said guide comprises:

a hollow mount connected to an upper end of said damper cylinder;

a support for said free piston formed at an upper section of said mount;

an inner tubular body formed at an upper section of said support and disposed along said piston rod;

an outer tubular body disposed contacting said inner tube; and a seal disposed between an outer periphery of said inner tubular body and an inner periphery of said outer tubular body; wherein said free piston slides freely through said seal.

4. A front fork for a motorcycle according to claim 2, wherein a gap opening to said reservoir is provided between said inner tubular body and said piston rod and a hole is provided which links with said gap on an upper section of said inner tubular body.

5. A front fork for a motorcycle according to claim 1, wherein said guide comprises:

a hollow mount connected to an upper end of said damper cylinder;

a support for said free piston formed at an upper section of said mount; and an outer tubular body disposed contacting said inner tube; wherein an inner periphery of said free piston slides freely on an outer periphery of said piston rod and an outer periphery of said free piston slides on an inner periphery of said outer tubular body.

6. A front fork for a motorcycle according to claim 1, wherein a check seal is provided which allows oil flow to an oil chamber in said damper cylinder from said reservoir on an inner side of said guide.

7. A front fork for a motorcycle according to claim 4, wherein a further gap is provided on an inner side of said free piston which allows oil flow to said hole from said lower oil chamber.

* * * * *